United States Patent [19]
Ono

[11] Patent Number: 6,026,360
[45] Date of Patent: Feb. 15, 2000

[54] SPEECH TRANSMISSION/RECEPTION SYSTEM IN WHICH ERROR DATA IS REPLACED BY SPEECH SYNTHESIZED DATA

[75] Inventor: Hiroshi Ono, Tokyo, Japan

[73] Assignee: NEC Corporation, Tokyo, Japan

[21] Appl. No.: 09/019,128

[22] Filed: Feb. 5, 1998

[30] Foreign Application Priority Data

Mar. 28, 1997 [JP] Japan .................................. 9-078169

[51] Int. Cl.[7] .................................................. G10L 5/02
[52] U.S. Cl. .......................................... 704/260; 704/228
[58] Field of Search ................................... 704/226, 227, 704/228, 265, 260, 220, 258; 714/751, 750, 761, 762

[56] References Cited

U.S. PATENT DOCUMENTS

| | | | |
|---|---|---|---|
| 4,123,711 | 10/1978 | Chow . | |
| 4,271,499 | 6/1981 | Leveque . | |
| 4,688,224 | 8/1987 | Dal Degan et al. | 704/233 |
| 5,142,582 | 8/1992 | Asakawa et al. | 704/228 |
| 5,526,366 | 6/1996 | Jarvinen et al. | 371/31 |
| 5,557,639 | 9/1996 | Heikkila et al. | 375/224 |

FOREIGN PATENT DOCUMENTS 7-240711  9/1995  Japan .

OTHER PUBLICATIONS

TIA/EIA Standsrd, Telecommunications Industry Association, pp. 68–70 and 139–174, Jun. 1996.

*Primary Examiner*—David R. Hudspeth
*Assistant Examiner*—Abul K. Azad
*Attorney, Agent, or Firm*—Scully, Scott, Murphy & Presser

[57] ABSTRACT

In a speech transmission/reception system, a speech data transmitting unit compresses a speech data, and then transmits the compressed speech data with a character data corresponding to the speech data. A speech data receiving/reproducing unit receives the compressed speech data, and detects whether any error portion is present in the received compressed speech data. The speech data receiving/reproducing unit reproduces, from the received compressed speech data, the speech data in which the error portion is replaced by speech synthesized data synthesized based on a portion of the character data corresponding to the error portion, when it is determined that the error portion is present in the received compressed speech data.

28 Claims, 11 Drawing Sheets

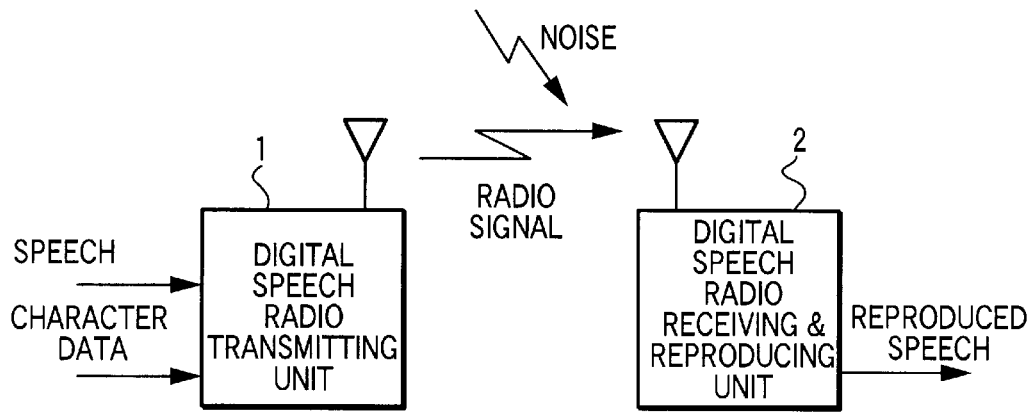
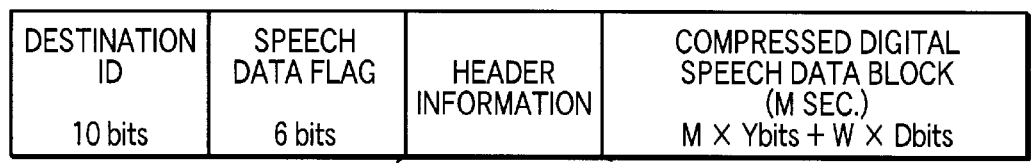
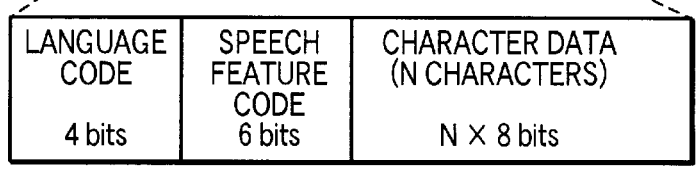

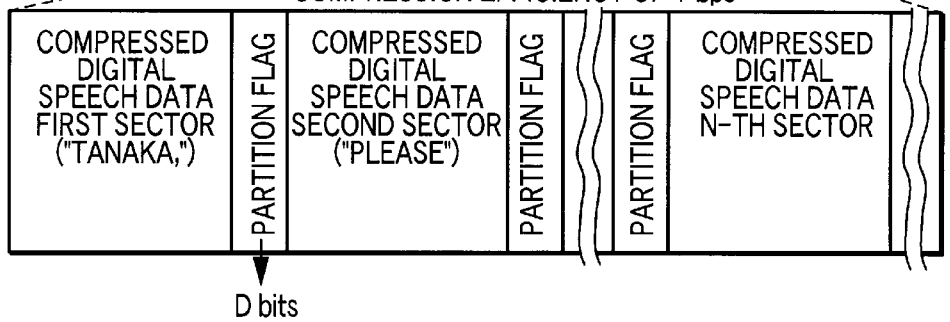

Fig. 5
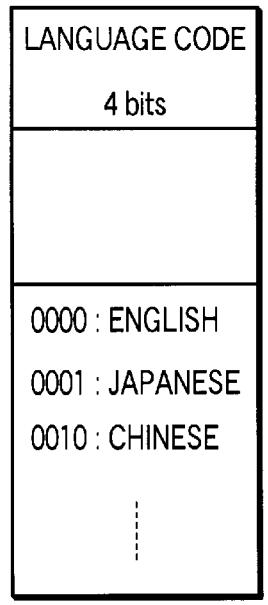
Fig. 6A
Fig. 6B
| SEXIAL CODE<br>1 bits | DIALECT CODE<br>3 bits | TONE CODE<br>1 bits | SPEECH SPEED CODE<br>1 bits |
|---|---|---|---|
| 0 : MALE<br>1 : FEMALE | 000 : TOKYO DIALECT<br>001 : OOSAKA DIALECT<br>010 : KYOTO DIALECT<br>011 : TOHOKU DIALECT<br><br>(WHEN LANGUAGE IS JAPANESE) | 0 : HIGH<br>1 : LOW | 0 : FAST<br>1 : SLOW |

Fig. 1 1 A
SPEECH MESSAGE "Tanaka, please call me. From Satoh."

Fig. 1 1 B
COMPRESSED DIGITAL SPEECH DATA

| Tanaka | , | please | call | me | . | From | Satoh | . |
|--------|----|--------|------|-----|----|------|-------|----|
| OK | OK | NG | OK | NG | OK | NG | OK | OK |

← SITUATION OF BCH ERROR

+

Fig. 1 1 C
CHARACTER DATA FOR SPEECH SYNTHESIZATION

| Tanaka | , | please | call | me | . | From | Satoh | . |
|--------|----|--------|------|-----|----|------|-------|----|
| NO | NO | YES | NO | YES | NO | YES | NO | NO |

← SYNTHESIZED OR NOT

↓

Fig. 1 1 D
REPRODUCED SPEECH DATA

| Tanaka | , | please | call | me | . | From | Satoh | . |
|--------|----|--------|------|-----|----|------|-------|----|
| ○ | ○ | × | ○ | × | ○ | × | ○ | ○ |
| × | × | ○ | × | ○ | × | ○ | × | × |

← EXPANDED PORTION OF COMPRESSED DATA
← SPEECH STNTHESIZED PORTION

SPEECH TRANSMISSION/RECEPTION SYSTEM IN WHICH ERROR DATA IS REPLACED BY SPEECH SYNTHESIZED DATA

BACKGROUND OF THE INVENTION

1. Field of the Invention

The present invention generally relates to a digital speech transmission/reception system. More specifically, the present invention is related to a digital speech transmission/reception system, which is composed of a digital speech transmitting unit, and a digital speech receiving/reproducing unit, and in which an error data portion of a digital speech data transmitted via a radio signal transmission path can be replaced by a speech synthesized data.

2. Description of the Related Art

As a conventional speech transmission system, for instance, a mobile radio communication system using a speech compressing method such as the ADPCM method and the V-SELP method is known. In order to correct an error portion of a speech data produced due to the fading effect in such a communication system, the error portion of the speech data is replaced by a portion of the speech data positioned immediately before the error portion of the speech data. Also, in another error correcting method, the speech data is reproduced with a low sound volume while the error portion of the speech data is reproduced. Such a technique is described in, for example, Japanese Laid-open Patent Application (JP-A-Heisei 7-240711).

However, there is a case where digital speed transmission is performed under a deteriorated radio signal transmission path, namely under low electric field strength for a radio signal, or under large change in electric field strength such as mobile communications from a vehicle driven through buildings. In such a case, it is practically difficult to transmit a digital speech data in perfect condition without any loss of the digital speech data. Even in such worse condition, in a bidirectional communication system, a data re-send request is issued and the speech data is received again so that the complete digital data can be received in practically perfect condition.

To the contrary, in a unidirectional radio transmission system, since a data re-send request is not allowed, it is necessary to issue the date re-send request by utilizing a wire communication system such as a telephone line.

This may be effective in acquisition of correct information. However, in a speech transmission system, when the content of speech is necessary to be understandable, since the immediate speech transmission has a top priority, the above-described system could not be practically accepted.

SUMMARY OF THE INVENTION

The present invention is made to solve the above problems. Therefore, an object of the present invention is to provide a digital speech transmission/reception system in which speech data can be correctly transmitted without issuing a data re-send request in a unidirectional speech transmission system, and for a method of transmitting a speech data for the same.

In order to achieve an aspect of the present invention, a speech transmission/reception system includes a speech data transmitting unit for compressing a speech data, and for transmitting the compressed speech data with a character data corresponding to the speech data, and a speech data receiving/reproducing unit for receiving the compressed speech data, for detecting whether any error portion is present in the received compressed speech data, for reproducing, from the received compressed speech data, the speech data in which the error portion is replaced by speech synthesized data synthesized based on a portion of the character data corresponding to the error portion, when it is determined that the error portion is present in the received compressed speech data.

The speech data receiving/reproducing unit includes an error detecting section for detecting whether any error portion is present in the received compressed speech data, to generate an error indication data, and a speech synthesizing section for generating the speech synthesized data for the error portion based on the portion of the character data corresponding to the error portion such that the speech data is reproduced in which the error portion is replaced by the speech synthesized data.

In this case, the speech data receiving/reproducing unit may include a memory for storing the speech data expanded from the received compressed speech data, a reproducing section for reproducing the speech data, and a control section for reading out the speech data to supply to the reproducing section such that the speech data is reproduced, for controlling the speech synthesizing section in response to the error indication data to generate the speech synthesized data, and for supplying the speech synthesized data to the reproducing section such that the speech synthesized data is reproduced in place of the error portion. Alternatively, the speech data receiving/reproducing unit may include a memory for storing the speech data expanded from the received compressed speech data, a reproducing section for reproducing the speech data, and a control section for controlling the speech synthesizing section in response to the error indication data to generate the speech synthesized data, for storing the speech synthesized data in the memory in place of the error portion, and for reading out the speech data to supply to the reproducing section such that the speech data is reproduced.

The speech data transmitting unit includes a partitioning section for partitioning the compressed speech data into compressed speech data sections in units of predetermined units, and for adding a partition flag between every two of the compressed speech data sections. The predetermined unit is one of a character, a word a phrase, and a sentence of the speech data. In this case, it is desirable that the control section in the speech data receiving/reproducing unit detects at least one predetermined unit associated with the error portion based on the partition flags, and controls the speech synthesizing section for the detected predetermined unit to generate the speech synthesized data.

The speech data transmitting unit transmits a speech synthesis control data to the speech data receiving/reproducing unit in addition to the compressed speech data with the character data. In this case, the speech synthesizing section generates the speech synthesized data for the error portion based on the portion of the character data corresponding to the error portion and the speech synthesis control data. The speech synthesis control data desirably includes a data indicative of language of the speech data, a data indicative of a sex of a speaker of the speech data, a data indicative of dialect of the language, a data indicative of a tone of the speech data, and a data indicative of a speech data speed of the speech data. In this case, the speech synthesizing section includes a synthesis memory for storing a plurality of synthesis data sets. At that time, the speech data receiving/reproducing unit includes a control which designates one of the plurality of synthesis date sets based on the speech synthesis control data.

In order to achieve another aspect of the present invention, a method of transmitting a speech data includes the steps of:

compressing a speech data;

transmitting the compressed speech data with a character data corresponding to the speech data;

when the compressed speech data is received, detecting whether any error portion is present in the compressed speech data;

storing the compressed speech data in a memory;

expanding the compressed speech data to produce the speech data; and reproducing the speech data in which the error portion is replaced by speech synthesized data synthesized based on a portion of the character data corresponding to the error portion, when it is determined that the error portion is present in the received compressed speech data.

In order to achieve still another aspect of the present invention, a speech data receiver, includes a receiving unit for receiving a compressed speech data, in which a speech data is compressed, and a character data corresponding to the speech data, an error detecting unit for detecting whether any error portion is present in the received compressed speech data, to generate an error indication data when the error portion is present, a speech synthesizing section for generating a speech synthesized data for the error portion in response to the error indication data based on the portion of the character data corresponding to the error portion, and a reproducing section for reproducing, from the received compressed speech data, the speech data in which the error portion is replaced by the speech synthesized data when it is determined that the error portion is present.

BRIEF DESCRIPTION OF THE DRAWINGS

The present invention would be understood from the following detailed description in conjunction with the accompanying drawings, in which:

FIG. 1 is a schematic block diagram for illustrating the entire structure of a digital speech radio transmission system of the present invention;

FIG. 2A and FIG. 2B illustrate a format of a radio signal used in the digital speech transmission system of FIG. 1, and a format of header information of the format of the radio signal, respectively;

FIG. 3A and FIG. 3B illustrate a compressed digital data block of the radio signal used in the digital speech radio transmission system of FIG. 1, and the internal data structure of the compressed digital data block, respectively;

FIG. 4A to FIG. 4E are diagrams for explaining the units of the speech data, respectively;

FIG. 5 shows a language code of the radio signal used in the digital speech radio transmission system of FIG. 1;

FIGS. 6A and 6B illustrate a speech feature code of the radio signal used in the digital speech radio transmission system of FIG. 1, and feature codes, respectively;

FIGS. 11A to 11D are conceptional diagrams for describing the construction of reproducing speech data used in the digital speech radio receiving apparatus of FIG. 10;

DESCRIPTION OF THE PREFERRED EMBODIMENTS

Figure 7:
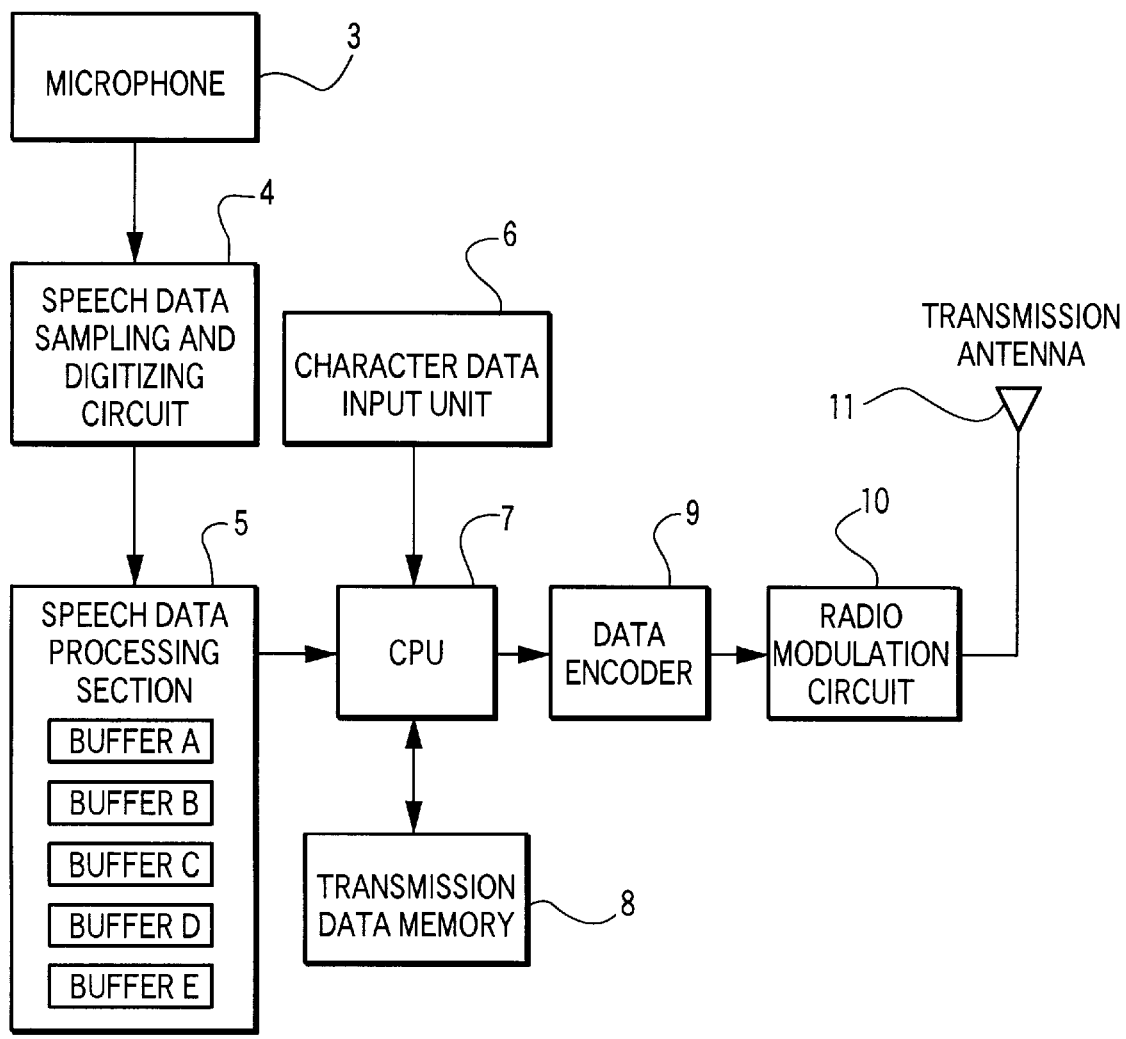
FIG. 7 is a schematic block diagram for illustrating the structure of a digital speech radio transmitting unit according to an embodiment of the present invention.

The digital speech radio transmitting/receiving system of the present invention will be described below in detail with reference to the accompanying drawings.

FIG. 1 is a block diagram illustrating the structure of a digital speech radio transmitting/receiving system such as a system of a portable information terminal (PDA), a PHS, and a portable telephone according to an embodiment of the present invention.

In a digital speech radio transmitting unit 1, a speech data to be transmitted is inputted and also character data related to this speech data is inputted. Both the inputted speech and character data are converted into a transfer signal for a radio signal path by the digital speech radio transmitting unit 1, and then the transfer signal is transmitted to a digital speech radio receiving/reproducing unit 2. At this time, noise is added to the transferred signal, depending upon the condition of the radio signal path.

When an error is contained in the signal received by the digital speech radio receiving/reproducing unit 2, the signal processing operation is performed so as to minimize the adverse influences caused by the noise, and then the speech reproducing operation is carried out in the digital speech radio receiving/reproducing unit 2.

As a method to minimize the adverse influences caused by the noise, the data to be transferred has a format as shown in FIGS. 2A and 2B. Subsequent to a destination ID of 10 bits indicative of destination, a speech data flag of 6 bits indicating that the message is speech data is transmitted. Header information contains information related to compressed digital speech data which is subsequently transmitted.

The header information preferably contains a language code indicative of a language of the speech data to be transmitted, a speech feature code representative of a feature of the speech data, and also character data having the completely same content as words used in the speech data. For example, when the speech is "Tanaka, please call me. From Satoh", the character data has the completely same content a "Tanaka, please call me. From Satoh" and is transmitted as a portion of the header information.

As shown in FIGS. 3A and 3B, the compress digital speech data block to be transmitted is partitioned by a partition flag in units of predetermined units, e.g., phrases. In the case of the above-described speech data, "Tanaka" is entered into a first sector, "please" is entered into a second sector, "call me" is inputted into a third sector, and "From Satoh" is inputted into a fourth sector. A partition flag made of D bits is interposed between every two of the respective sectors. As another embodiment, as illustrated in FIGS. 4A to 4E, the speech data may be partitioned every character, every word, every phrase or every sentence.

On the other hand, the language code of 4 bits contained in the header information shown in FIG. 2B represents a speech language such as English and Japanese, as indicated in an example of FIG. 5.

FIGS. 6A and 6B show an embodiment of a speech feature code. This speech feature code is composed of a sexual code of 1 bit as data indicative of the sex of a speaker, a dialect code indicative of features such as accent and the like, a tone code indicative of whether the tone of the speech data is high or low, and also a speech speed code indicative of whether the speech speed is fast or slow.

Next, a description will now be made of the structure of the digital speech radio transmitting unit and the digital speech radio receiving unit, which constitute the digital speech radio transmission/reception apparatus according to the present invention.

FIG. 7 is a schematic block diagram for showing an internal structure of a digital speech radio transmitting unit according to an embodiment of the present invention.

In this digital speech radio transmitting unit, a speech data to be transmitted is entered from a microphone 3, and then is converted into digital data by a speech data sampling and digitizing circuit 4. Thereafter, this digital data is compressed by a speech data processing section 5 which has buffers A to E. A partition flag is inserted between every two of the sectors of the compressed speech data, as shown in FIGS. 3A and 3B. Then, the resultant digital data is transferred to a CPU 7. The CPU 7 stores the data in a transmission data memory 8.

On the other hand, character data related to the speech data is entered from a character data input unit 6 to be similarly transferred to this CPU 7. The CPU 7 stores the character data in the transmission data memory 8.

When the compressed digital speech data is to be transmitted, the compressed digital speech data and the character data are read out from the transmission data memory 8 by the CPU and supplied to the data encoder 9. The data encoder 9 converts the format of this compressed digital speech data and character data into a data format for radio transfer, i.e., a BCH code corresponding to a data code used to detect any data error in the radio signal path. Further, the frequency of this compressed digital speech data is converted/modulated into a radio frequency by a radio modulation circuit 10. Thus, the resultant compressed digital speech data with the character data is transmitted via a transmission antenna 11 in the format shown in FIG. 2A.

Referring now to flow charts of FIGS. 8 and 9, a forming operation of transmission data by the digital speech radio transmitting unit of this embodiment of the present invention will be explained in detail.

Figure 8:
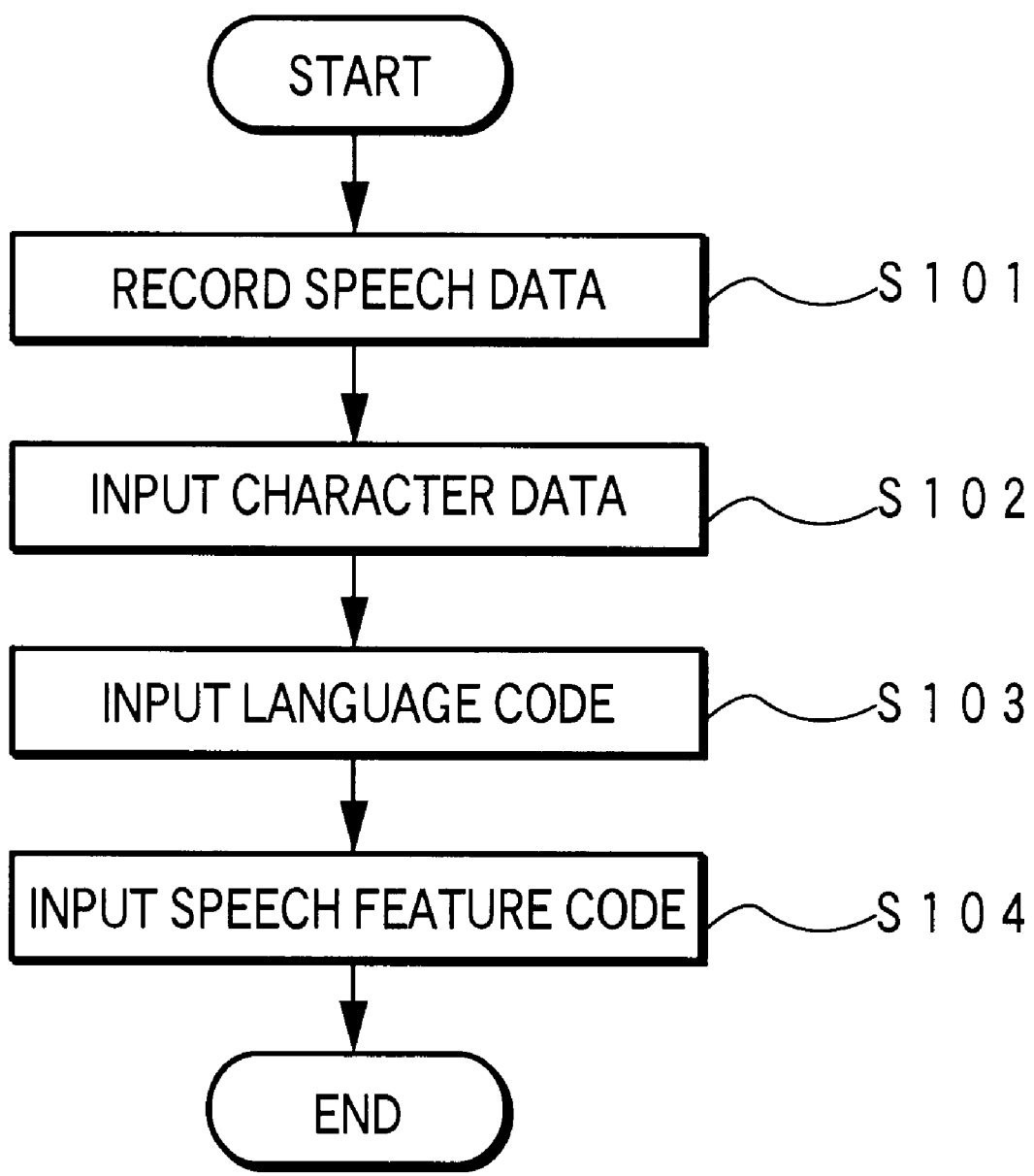
FIG. 8 is a flow chart for describing the construction of transmission data used in the digital speech radio transmitting apparatus of FIG. 7.

As indicated in FIG. 8, after the speech data to be transmitted has been recorded (step S101), the character data having the same content as that of the recorded speech is inputted (step S102). Thereafter, a speech language and also a feature of a speaker of the speech data are entered as a language code and a speech feature code (steps S103 and S104). It should be noted that both the language code and the speech feature code are previously registered in the transmission data memory 8 and the like such that the CPU 7 reads out these language code and speech feature code from the memory 8 and the like to add these language code and the speech feature code to the header information of the transmission data.

Figure 9:
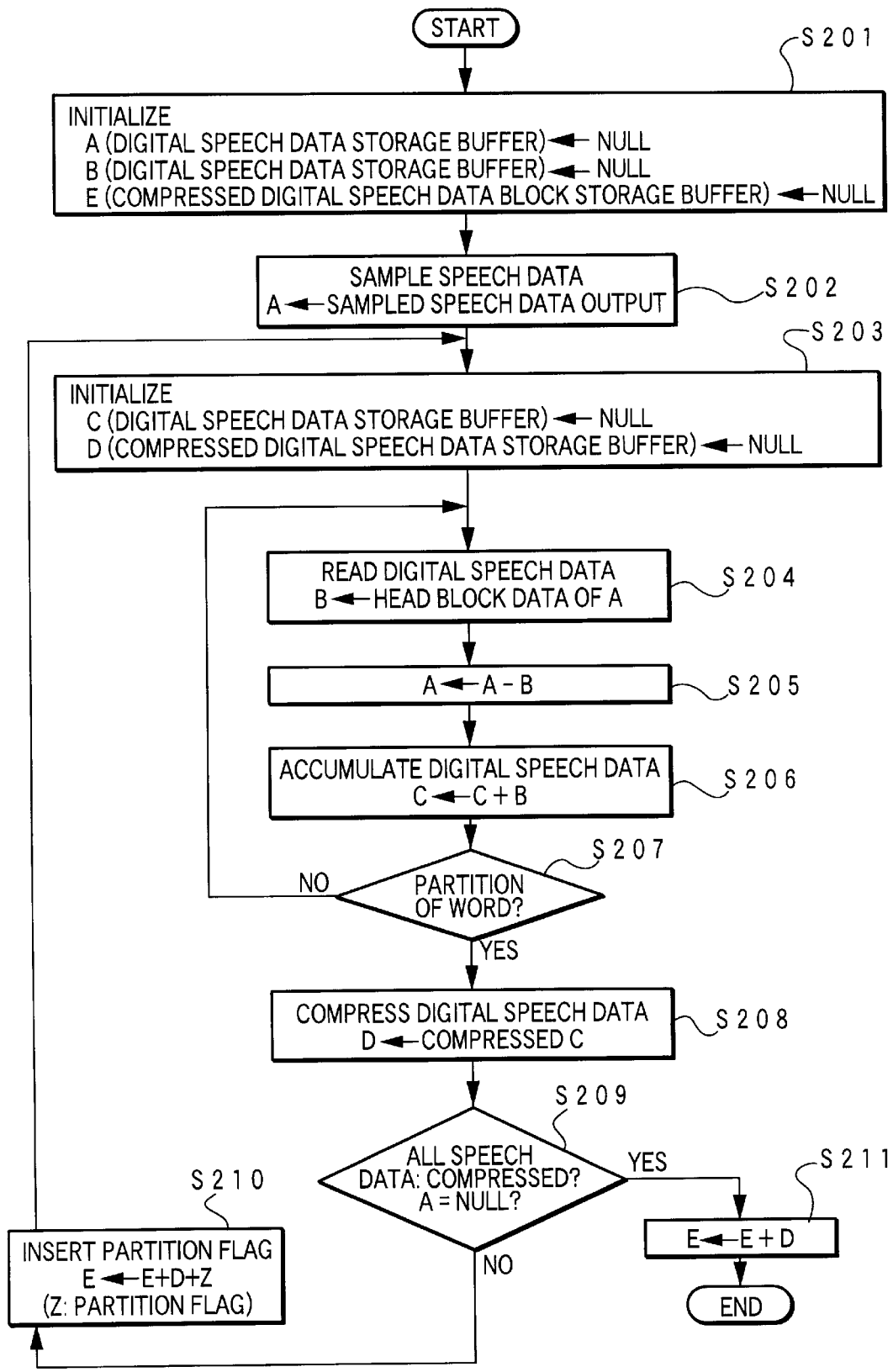
FIG. 9 is a flow chart for explaining the construction of a compressed digital speech data block employed in the digital speech radio transmitting apparatus of FIG. 7.

FIG. 9 is a flow chart illustrating the operation executed by the speech data processing section 5 to insert the partition flag when the inputted speech data is digitized and compressed.

At a first step S201, contents of buffers A B, E of the speech data processing in the speech data processing section 5 are cleared. Subsequently, the digital speech sampled data is saved into buffer A at a step S202.

After contents of buffers C and D are cleared (step S203), the control enters the operation in which a unit of speech, namely a word in this case, is judged.

First, the data saved in the buffer A is subdivided into a plurality of data portions which will then be sequentially transferred to the buffer B (step S204). The transferred data portion is removed from the buffer A (step S205). The data portion is stored into the buffer C to add the data portion to an already stored data such that the added result constitute a word (functioning as a unit of speech) at a step S206.

A check is made to see whether or not a partition of the word is present, i.e., whether the word is formed (step S207). If no partition of the word is present, then the control returns to the step S204. As a result, the data portions are sequentially stored via the buffer B into the buffer C, and this storing operation of the data portions is repeatedly performed.

In this embodiment, the data is transferred from the buffer A such that a combination of the subdivided data portions may constitute a word. A decision as to whether or not a portion of a word appears may be made by the following method. That is, for instance, all of words are previously registered in the speech data processing section 5, and a judgment is made as to whether or not the combination of the subdivided data portions is coincident with any of the registered words. It is preferable that which of a character, a word, a phrase and a sentence is used as a unit is selected by the character data input unit 6.

At the time when the word is constituted of the subdivided data portions stored in the buffer C, the speech data saved in the buffer C is compressed, and then the compressed speech data is stored into the buffer D (step S208).

Subsequently, another check is done as to whether or not the buffer A is empty (step S209). If the buffer A is not empty, then the data of the buffer D is additionally stored into the buffer E, and furthermore the partition flag is subsequently stored (step S210).

Thereafter, the control returns to the step S203 in which the subdivided data portions are transferred from the buffer A.

Conversely, when the buffer A is empty, the data stored in the buffer D is additionally stored into the buffer E, so that this operation is ended (step S211). As a result, the compressed speech data is stored into the buffer E in the state in which the speech data has been compressed, and the partition flags are interposed between every two of the respective words.

Figure 10:
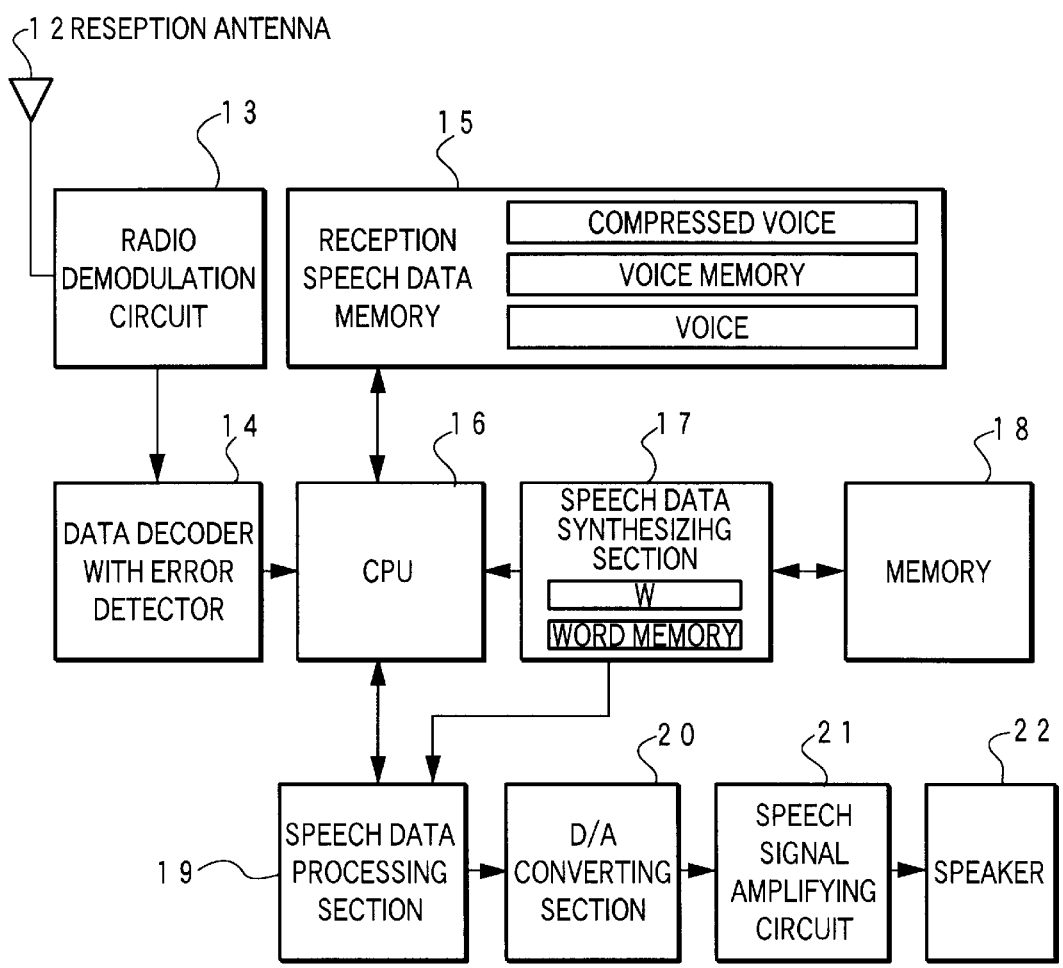
FIG. 10 is a schematic block diagram for illustrating the structure of a digital speech radio receiving unit according to an embodiment of the present invention.

FIG. 10 is a schematic block diagram for illustrating the internal structure of a digital speech radio receiving/reproducing unit according to the embodiment of the present invention.

In this digital speech radio receiving/reproducing unit, a radio signal which has transmitted from the digital speech radio transmitting unit 1 is received by a reception antenna 12, and then is demodulated by a radio demodulation circuit 13. A data decoder 14 which is equipped with an error detector detects whether or not any error is in the demodulated data. In this embodiment, this error detection is performed based on the BCH code. The decoded data is sent to a CPU 16. Also, an error indication data used to indicate whether or not any error data portion is present is sent to the CPU 16.

The CPU 16 stores a combination of the language code, the speech feature code, and the character data, which are the header information, in a reception speech data memory 15, in addition to the compressed digital speech data and the character data as a set.

To reproduce the speech data, the CPU 16 reads out the compressed digital speech data from the reception speech data memory 15 to supply to a speech data processing section 19. The speech data processing section 19 expands the compressed digital speech data. The expanded speech data is supplied to a D/A converting section 20. The expanded digital speech data is converted into an analog speech signal by the digital/analog converting section 20, and this analog speech signal is amplified by a speech signal amplifying circuit 21 to be outputted by a speaker 22. As a result, the speech can be reproduced.

When there is any error data portion in the compressed speech data, the CPU 16 activates a speech data synthesizing section 17 in response to the error indication data. A speech synthesizing operation is carried out by the speech data synthesizing section 17 by referring to the character data, the language code, and the speech feature code, which are contained in the header, based on the speech data saved in a speech synthesizing data memory 18. Also, it is desirable that a plurality of speech synthesis data sets are previously stored in the memory 18. That is, the speech data synthesizing section 17 designates one of the plurality of speech synthesis data sets based on the language code, and the speech feature code. Then, the speech data synthesizing section 17 performs speech synthesis based on a portion of the character data corresponding to the error data portion of the speech data using the designated speech synthesis data. The resultant speech synthesize data is supplied to the speech data processing section 19.

The speech data processing section 19 does not perform the expansion processing of the speech data to the error data portion. Instead, the speech data processing section 19 supplies the speech synthesized data inputted from the speech data synthesizing section 17 to the D/A converting section 20.

In this manner, the error data portion contained in the expanded speech data is replaced by the speech synthesized data. In this case, the speech synthesis is performed in unit of a character, a word, a phrase, or a sentence. The unit is the same as the unit located between the partition flags, as shown in FIG. 3B.

In the above description, the replacement by the speech synthesized data is performed during the reproduction of the speech data. However, the speech synthesized data may be stored in the reception speech data memory 15 to replace the error data portion by the speech synthesized data. In this case, after all the error data portions are replaced to produce a corrected speech data, the corrected speech data is read out from the memory 15 by the CPU 16, an then the reproduction is performed.

Referring to FIGS. 11A to 11D, the reproduction operation for the speech data which is expanded from the compressed digital speech data and the speech synthesized data will now be summarized. It is now assumed that a message "Tanaka, please call me. From Satoh" is inputted as a speech message. The character data having the same content as that of this speech message is entered. In a case that a BCH error is detected in the compressed digital speech data, the speech data is partially replaced by the speech synthesized data in units of pre-selected sectors such as a word. In this case, the speech data replacement is performed in unit of the word The words, "please" and "me", correspond to the speech data portions from which the BCH errors are detected, and the words "please" and "me" are reproduced by way of the speech synthesizing operation.

Next, a reproducing operation of speech data from reception data by the digital speech radio receiving/reproducing unit according to the embodiment of the present invention will now be explained with reference to flow charts shown in FIGS. 12, 13, and 14.

Figure 12:
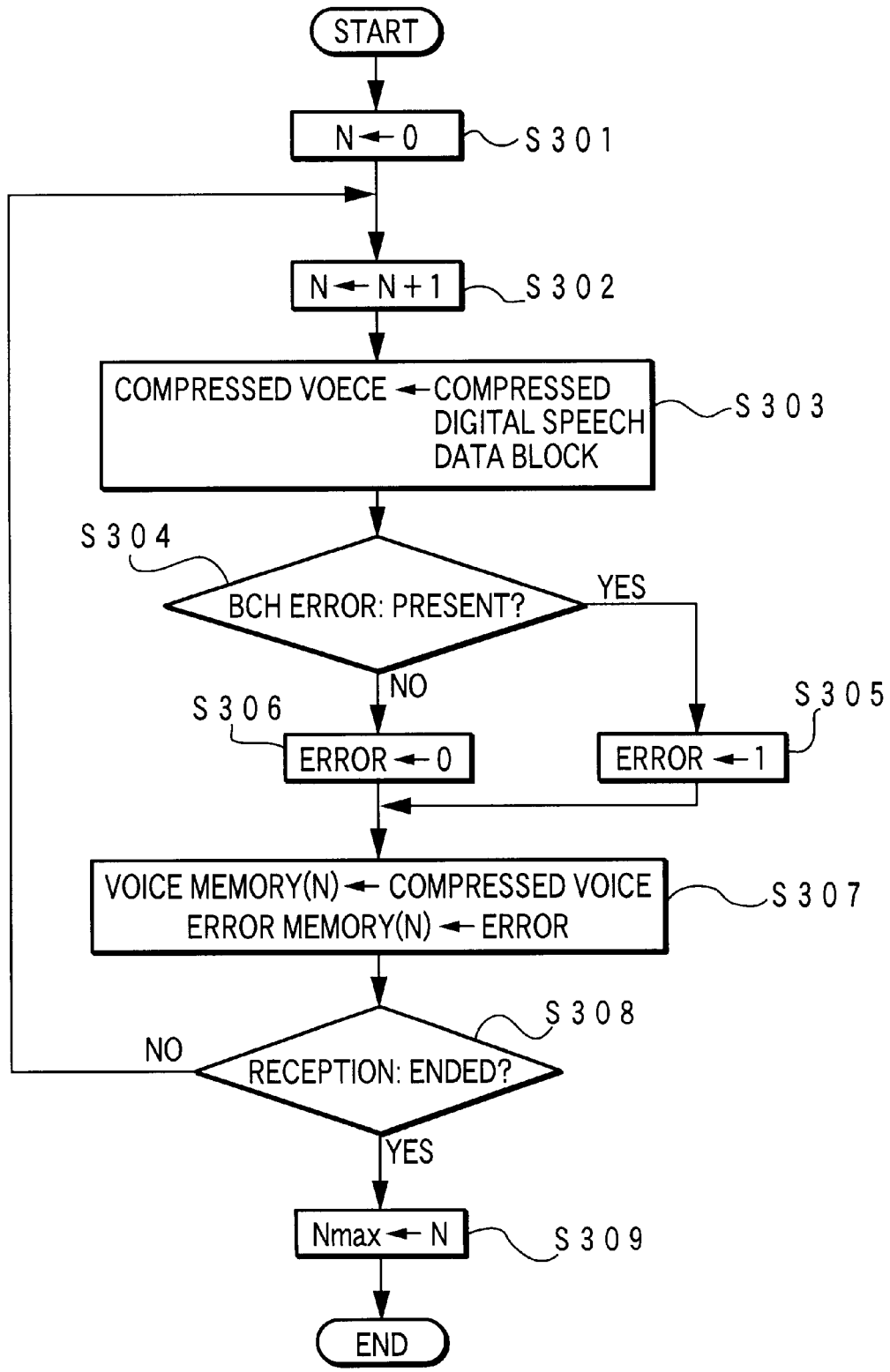
FIG. 12 is a flow chart for explaining a receiving operation of a compressed digital speech data block employed in the digital speech radio receiving apparatus of FIG. 10.

That is, FIG. 12 is a flow chart for explaining a flow operation where the data error portion contained in the compressed digital speech data received by this digital speech radio receiving/reproducing unit 2 is detected by the data decoder 14 equipped with the error detector. At that time, the detected data error portion is stored into the reception speech data memory 15.

In this flow chart of FIG. 12, "0" is substituted for a variable "N" (step S301), and this variable "N" is incremented one by one (step S302). A portion of compressed digital speech data is extracted from data which has been stored in the memory, and then the extracted speech data portion is stored in units of blocks, namely a data portion within a BCH frame in this case, into a buffer "Compressed Voice" (step S303). When the BCH error is detected ("YES" at step S304), "1" is substituted for a variable "Error" (step S305). Conversely, when the BCH error is not detected ("NO" at step S304), "0" is substituted for the variable "Error" (step S306).

The compressed digital speech data stored in the buffer "Compressed Voice" is transferred to a memory "Voice Memory (N)" arranged within the reception speech data memory 15, and the value of the variable "Error" is stored into this memory "Error Memory (N)" (Step S307). This operation is repeatedly performed until the reception of the compressed digital speech data is accomplished (steps S308 and S309).

Figure 13:
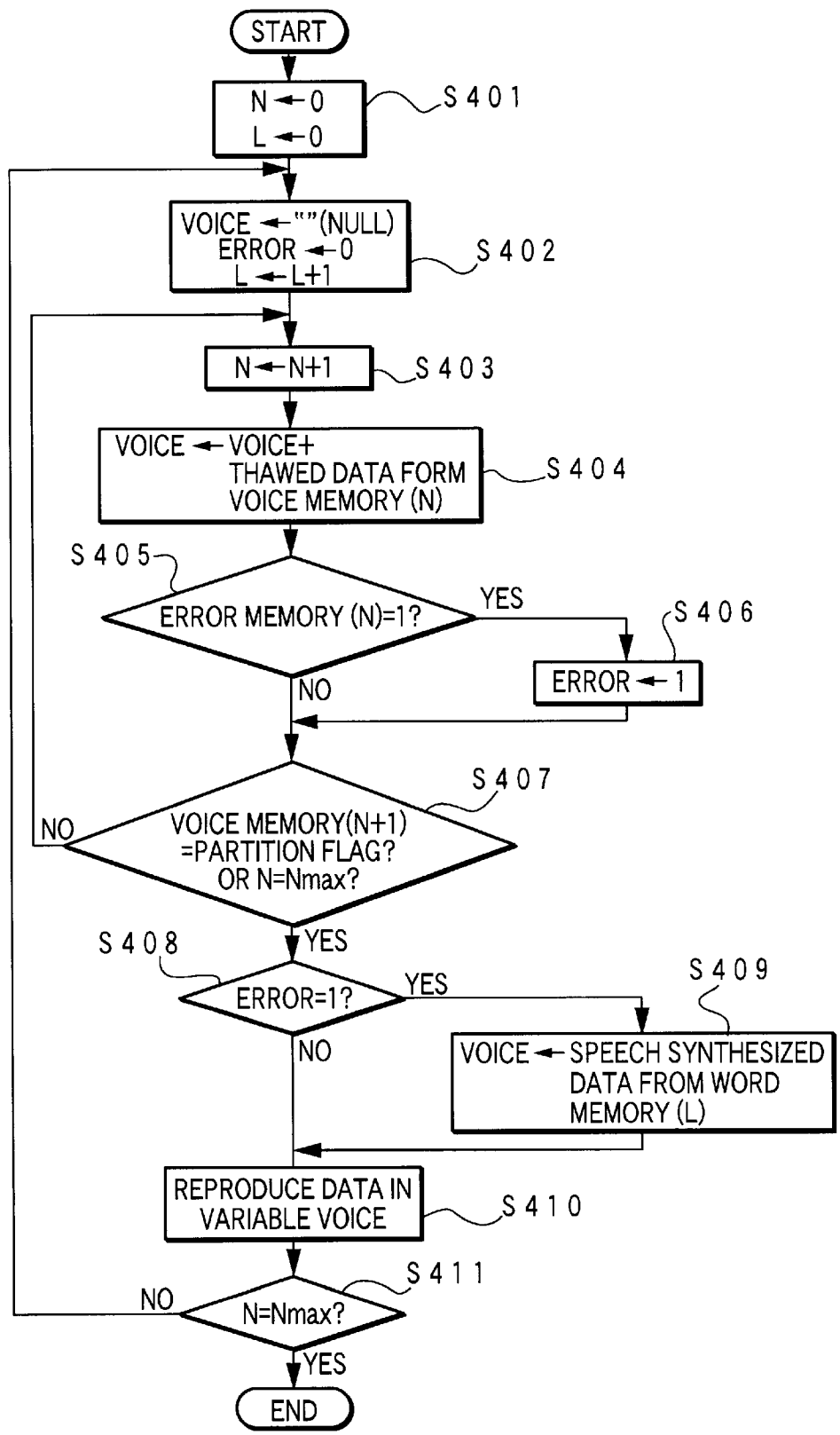
FIG. 13 is a flow chart for explaining the construction of reproduced speech data used in a digital speech radio transmission/reception apparatus according to an embodiment of the present invention.

FIG. 13 is a flow chart to explain a data forming operation for reproducing the speech data from the compressed digital speech data stored in the reception speech data memory 15 defined in the flow chart of FIG. 12.

First, "0" is substituted for a variable "N" and another variable "L" (step S401). Also, a buffer "Voice" is cleared, and "0" is entered into the variable "Error". While the variable "L" is incremented one by one, the speech data is counted in units of predetermined units, namely in units of words (step S402). While the variable "N" is incremented one by one (step S403), the compressed digital speech data stored in the memory "Voice Memory (N)" is expanded, and the expanded speech data is stored into the buffer "Voice" in units of words (step S404).

In a case that the content of the memory "Error Memory (N)" is equal to "1" ("YES" at step S405), "1" is substituted for the variable "Error" (step S406).

Finally, in the case that the data with the BCH error is contained in a portion of the digital speech data saved in the buffer "Voice", the variable "Error" is set to "1".

When the speech data stored in the buffer "Voice" is actually reproduced (step S407), if the variable "Error" is equal to "1" ("YES" at step S408), then the speech data stored in the buffer "Voice" is not reproduced. However, instead, the character data stored in a memory "Word Memory (L)" used in the flow chart of FIG. 14 to be described later is used for speech-synthesis in the speech data synthesizing section 17. As a result, the speech synthesized data is reproduced (steps S409 and S410). This operation is repeatedly performed until the last data saved in the memory "Voice Memory (N)" is read (step S411).

Figure 14:
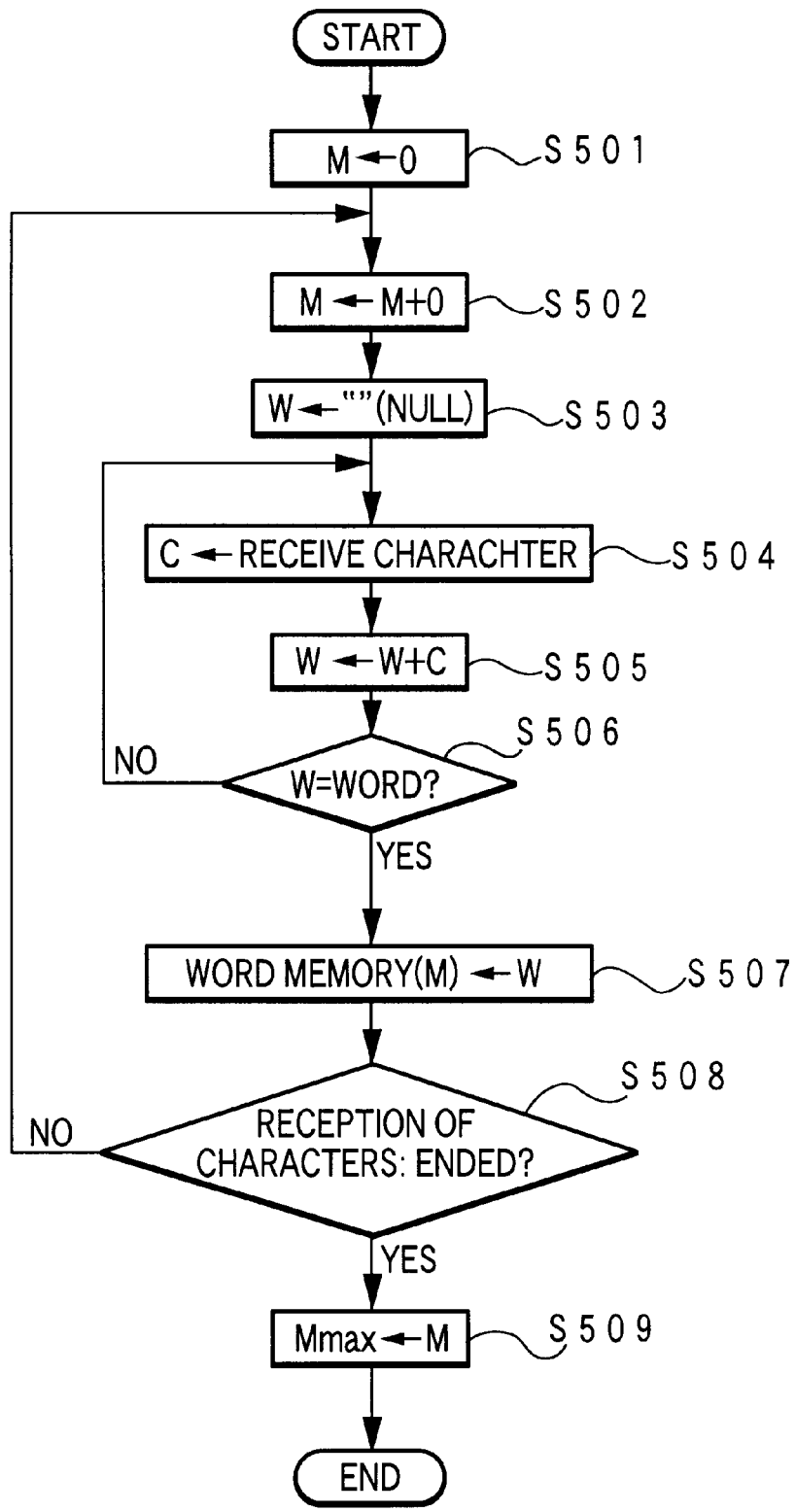
FIG. 14 is a flow chart for explaining a receiving operation of character data used in the digital speech radio transmission/reception apparatus of FIG. 13.

FIG. 14 is a flow chart for explaining an operation for storing the character data used in the speech synthesizing operation from the received data in units of predetermined units, namely in units of words in this embodiment.

At a first step S501, "0" is substituted for a variable M, and then this variable M is incremented one by one (step S502). A buffer W is cleared (step S503), and the received character data is entered and stored into this buffer W one by one (steps S504 and S505). The data acquisition of the character data is repeatedly carried out until the content of this buffer W becomes a word (step S506). When the content of the buffer W becomes the word, the data saved in the buffer W is transferred to a memory "Word Memory (M)" (step S507). Both the data acquisition of the character data and the data transfer operation to the memory "Word Memory (M)" are repeatedly carried out until the reception of the character data is ended (steps S508 and S509).

As previously described in detail, in accordance with the present invention, in the unidirectional speech data transmission system, it is possible to realize the stable transmission system in which the speech data can be instantaneously transferred without issuing the data re-send instruction. As a consequence, such a system capable of communicating speech can be realized by way of a simple system such as an individual selective call system as the unidirectional radio transfer system.

What is claimed is:

1. A speech transmission/reception system comprising:
   a speech data transmitting unit for compressing a speech data, and for transmitting said compressed speech data with a character data corresponding to said speech data; and
   a speech data receiving/reproducing unit for receiving said compressed speech data, for detecting whether any error portion is present in the received compressed speech data, for reproducing, from said received compressed speech data, said speech data in which the error portion is replaced by speech synthesized data synthesized based on a portion of said character data corresponding to the error portion, when it is determined that the error portion is present in the received compressed speech data, wherein the speech synthesized data is generated by matching the speech data of the error portion with one of a plurality of speech synthesis data sets stored in memory and corresponding to said character data.

2. A speech data transmission/reception system according to claim 1, wherein said speech data receiving/reproducing unit includes:
   an error detecting section for detecting whether any error portion is present in the received compressed speech data, to generate an error indication data; and
   a speech synthesizing section for generating said speech synthesized data for said error portion based on said portion of said character data corresponding to said error portion such that said speech data is reproduced in which the error portion is replaced by said speech synthesized data.

3. A speech data transmission/reception system according to claim 2, wherein said speech data receiving/reproducing unit includes:
   a memory for storing said speech data expanded from the received compressed speech data;
   a reproducing section for reproducing said speech data; and
   a control section for reading out said speech data to supply to said reproducing section such that said speech data is reproduced, for controlling said speech synthesizing section in response to said error indication data to generate said speech synthesized data, and for supplying said speech synthesized data to said reproducing section such that said speech synthesized data is reproduced in place of said error portion.

4. A speech data transmission/reception system according to claim 2, wherein said speech data receiving/reproducing unit includes:
   a memory for storing said speech data expanded from the received compressed speech data;
   a reproducing section for reproducing said speech data; and
   a control section for controlling said speech synthesizing section in response to said error indication data to generate said speech synthesized data, for storing said speech synthesized data in said memory in place of said error portion, and for reading out said speech data to supply to said reproducing section such that said speech data is reproduced.

5. A speech data transmission/reception system according to claim 2, wherein said speech data transmitting unit includes a partitioning section for partitioning said compressed speech data into compressed speech data sections in predetermined units of speech data of different lengths of data corresponding to the content of the speech data, and for adding a partition flag between every two of the compressed speech data sections.

6. A speech data transmission/reception system according to claim 5, wherein said predetermined unit is one of a character, a word, a phrase, and a sentence of said speech data.

7. A speech data transmission/reception system according to claim 5, wherein said control section in said speech data receiving/reproducing unit detects at least one predetermined unit associated with said error portion based on said partition flags, and controls said speech synthesizing section for said detected predetermined unit to generate said speech synthesized data.

8. A speech data transmission/reception system according to claim 2, wherein said speech data transmitting unit transmits a speech synthesis control data to said speech data receiving/reproducing unit in addition to said compressed speech data with said character data, and
   wherein said speech synthesizing section generates said speech synthesized data for said error portion based on said portion of said character data corresponding to said error portion and said speech synthesis control data.

9. A speech data transmission/reception system according to claim 8, wherein said speech synthesis control data includes at least one of a data indicative of language of said speech data, a data indicative of a sex of a speaker of said speech data, a data indicative of dialect of the language, a data indicative of a tone of said speech data, and a data indicative of a speech data speed of said speech data.

10. A speech data transmission/reception system according to claim 8, wherein said speech synthesizing section includes a synthesis memory for storing said plurality of synthesis data sets, and wherein said speech data receiving/reproducing unit includes a control section which designates one of said plurality of synthesis data sets based on said speech synthesis control data.

11. A method of transmitting a speech data comprising the steps of:

compressing a speech data;

transmitting said compressed speech data with a character data corresponding to said speech data;

when said compressed speech data is received, detecting whether any error portion is present in the compressed speech data;

storing said compressed speech data in a memory;

expanding said compressed speech data to produce said speech data;

reproducing said speech data in which the error portion is replaced by speech synthesized data synthesized based on a portion of said character data corresponding to the error portion, when it is determined that the error portion is present in the received compressed speech data, wherein the speech synthesized data is generated by matching the speech data of the error portion with one of a plurality of speech synthesis data sets stored in memory and corresponding to said character data.

12. A method according to claim 11, wherein said reproducing step includes:

generating said speech synthesized data for said error portion based on said portion of said character data corresponding to said error portion such that said speech data is reproduced in which the error portion is replaced by said speech synthesized data.

13. A method according to claim 12, wherein said reproducing step includes:

reading out said speech data from said memory such that said speech data is reproduced; and reproducing said speech synthesized data in place of said error portion during the reproduction of said speech data.

14. A method according to claim 12, wherein said reproducing step includes:

generating said speech synthesized data for said error potion to store said speech synthesized data in said memory in place of said error portion; and reading out said stored speech data from said memory such that said speech data is reproduced.

15. A method according to claim 11, wherein said compressing step includes:

partitioning said compressed speech data into speech data sections in predetermined units of speech data of different lengths of data corresponding to the content of the speech data; and adding a partition flag between every two of the compressed speech data sections.

16. A method according to claim 15, wherein said predetermined unit is one of a character, a word, a phrase, and a sentence of said speech data.

17. A method according to claim 15, wherein said detecting step includes:

detecting at least one predetermined unit associated with said error portion based on said partition flags, and wherein said reproducing step includes generating said speech synthesized data for the detected predetermined unit.

18. A method according to claim 11, wherein said transmitting step includes transmitting a speech synthesis control data in addition to said compressed speech data with said character data, and wherein said reproducing step includes generating said speech synthesized data for said error portion based on said portion of said character data corresponding to said error portion and said speech synthesis control data.

19. A method according to claim 18, wherein said speech synthesis control data includes at least one of a data indicative of language of said speech data, a data indicative of a sex of a speaker of said speech data, a data indicative of dialect of the language, a data indicative of a of said speech data, and a data indicative of a speech data speed of said speech data.

20. A method according to claim 18, wherein said reproducing step includes:

designating one of the plurality of synthesis data sets based on said speech synthesis control data; and generating said speech synthesized data for said error portion based on said portion of said character data corresponding to said error portion using the designated synthesis data set.

21. A speech data receiver, comprising:

a receiving unit for receiving a compressed speech data, in which a speech data is compressed, and a character data corresponding to said speech data; and an error detecting unit for detecting whether any error portion is present in the received compressed speech data, to generate an error indication data when said error portion is present;

a speech synthesizing section for generating a speech synthesized data for said error portion in response to said error indication data based on said portion of said character data corresponding to said error portion, wherein the speech synthesized data is generated by matching the speech data of the error portion with one of a plurality of speech synthesis data sets stored in memory and corresponding to said character data; and a reproducing section for reproducing, from said received compressed speech data, said speech data in which said error portion is replaced by said speech synthesized data when it is determined that said error portion is present.

22. A speech data receiver according to claim 21, wherein said reproducing section includes:

a memory for storing said speech data expanded from the received compressed speech data;

a speech reproducing section for reproducing said speech data; and a control section for reading out said speech data to supply to said speech reproducing section such that said speech data is reproduced, for controlling said speech synthesizing section in response to said error indication data to generate said speech synthesized data, and for supplying said speech synthesized data to said speech reproducing section such that said speech synthesized data is reproduced in place of said error portion.

23. A speech data receiver according to claim 21, wherein said reproducing section includes:

a memory for storing said speech data expanded from the received compressed speech data;

a speech reproducing section for reproducing said speech data; and a control section for controlling said speech synthesizing section in response to said error indication data to generate said speech synthesized data, for storing said speech synthesized data in said memory in place of said error portion, and for reading out said speech data to supply to said speech reproducing section such that said speech data is reproduced.

24. A speech data receiver according to claim 21, wherein the compressed speech data is partitioned into compressed speech data sections of predetermined units of speech data of different lengths of data corresponding to the content of the speech data, wherein said predetermined unit is one of a character, a word, a phrase, and a sentence of said speech data.

25. A speech data receiver according to claim 24, wherein said speech synthesizing section generates said speech synthesized data for a predetermined unit.

26. A speech data receiver according to claim 21, wherein said speech data synthesizing section generates said speech synthesized data for said error portion based on said portion of said character data corresponding to said error portion and a speech data synthesis control data, and wherein said receiving unit receives said speech data synthesis control data in addition to said compressed speech data and said character data.

27. A speech data receiver according to claim 26, wherein said speech data synthesis control data includes at least one of a data indicative of language of said speech data, a data indicative of a sex of a speaker of said speech data, a data indicative of dialect of the language, a data indicative of a tone of said speech data, and a data indicative of a speech data speed of said speech data.

28. A speech data receiver according to claim 26, wherein said speech synthesizing section includes a synthesis memory for storing said plurality of synthesis data sets, and wherein said reproducing section designates one of said plurality of synthesis data sets based on said speech synthesis control data.

* * * * *

UNITED STATES PATENT AND TRADEMARK OFFICE
CERTIFICATE OF CORRECTION

PATENT NO.   : 6,026,360
DATED        : February 15, 2000
INVENTOR(S)  : Hiroshi Ono It is certified that error appears in the above-identified patent and that said Letters Patent is hereby corrected as shown below:

Column 1,
Line 46: "date" should read -- data --

Column 11,
Line 45, Claim 14: "potion" should read -- portion --

Column 12,
Line 13, Claim 19: "of" should read -- tone of --

Signed and Sealed this

Twenty-first Day of August, 2001

Attest:

*Nicholas P. Godici*

NICHOLAS P. GODICI
*Attesting Officer*    *Acting Director of the United States Patent and Trademark Office*